(12) United States Patent
Mueller et al.

(10) Patent No.: US 6,584,612 B1
(45) Date of Patent: Jun. 24, 2003

(54) TRANSPARENT LOADING OF RESOURCES FROM READ-ONLY MEMORY FOR AN APPLICATION PROGRAM

(75) Inventors: Patrick James Mueller, Apex, NC (US); Eric Christopher Smith, Cary, NC (US); Timothy James Wolf, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,880

(22) Filed: Jul. 15, 1999

(51) Int. Cl.7 .................................. G06F 9/44
(52) U.S. Cl. ........................ 717/166; 717/118
(58) Field of Search .................. 717/4, 1, 10, 166, 717/165, 163; 707/3, 509; 711/102; 709/331, 332

(56) References Cited

U.S. PATENT DOCUMENTS

| | | | | |
|---|---|---|---|---|
| 5,893,118 A | * | 4/1999 | Sonderegger | 707/203 |
| 5,966,542 A | * | 10/1999 | Tock | 717/11 |
| 5,966,702 A | * | 10/1999 | Fresko et al. | 707/1 |
| 6,092,147 A | * | 7/2000 | Levy et al. | 711/6 |
| 6,167,253 A | * | 12/2000 | Farris et al. | 455/412 |
| 6,305,009 B1 | * | 10/2001 | Goor | 717/4 |
| 6,349,344 B1 | * | 2/2002 | Sauntry et al. | 709/332 |
| 6,470,494 B1 | * | 10/2002 | Chan et al. | 717/166 |

OTHER PUBLICATIONS

Freund et al. A Type System for Object Initialization In the Java Bytecode Language. ACM. 1998. pp. 310–327.*

* cited by examiner

Primary Examiner—Gregory Morse
Assistant Examiner—Wei Zhen
(74) Attorney, Agent, or Firm—Gregory M. Doudnikoff

(57) ABSTRACT

A method, system, and computer program product for transparently loading resources (such as stored bitmaps, images, fonts, and sound files) from read-only memory ("ROM") for an application program executing on a Java Virtual Machine ("JVM"). Typically, the invention will be used on an embedded computing device which has no disk storage and no file system software. A novel class loader is described, which loads resources from ROM and returns an input stream object as is expected by the existing application program. Therefore, when using the present invention, no change is required to existing application code to use resources stored in ROM. (In addition, no change to existing applications is required in order to invoke the code of the present invention.) The invention may be used with programs written in the Java programming language, or with programs written in other languages that execute on a JVM.

12 Claims, 9 Drawing Sheets

Fig. 7

```
700  package com.ibm.ive.romLoadingClassLoader;

import java.io.*;
     import java.util.*;
     import com.ibm.ive.osMemory.*;      707

705  public class RomLoadingClassLoader extends ClassLoader implements
     OSMemoryResourceLoader {
         private Hashtable resTable();    706

710  public RomLoadingClassLoader(ClassLoader parent, OSMemory pointer) {   711
         super(parent);
         initializeResTable(pointer);
     }    712

715  private void initializeResTable(OSMemory pointer) {
         ... Given the pointer to the resource table
         ... build a Hashtable with keys and pointer to
         ... the resources as well as resource length.
     }

720  public InputStream getResourceAsStream(String name) {
         OSMemory osMemory;

osMemory = (OSMemory) resTable.get(name);
         if (osMemory == null) return null;

return osMemory.getInputStream();
     }    721
     }
```

```
800   package com.ibm.ive.osMemory;

import java.io.*;

805   public class OSMemory {
          private int  pointer;  806
          private int  size;     807

810   public OSMemory(int pointer, int size) {
          super();

this.pointer   = (int) pointer;
          this.size      = size;      811
          this.allocated = false;
      }

815   native public byte getByte(int offset);

820   public int getSize() {
          return size;
      }   821

825   public InputStream getInputStream() {
          return new OSMemoryInputStream(this);
      }
      }
```

Fig. 8

```
900  package com.ibm.ive.osMemory;

import java.io.*;

905  class OSMemoryInputStream extends InputStream {
       private OSMemory osMemory;
       private int    offset;

910    public OSMemoryInputStream(OSMemory osMemory) {
         super();

this.osMemory = osMemory;
         this.offset = 0;
       }

920    public int available() throws IOException {
         return osMemory.getSize() - offset;
       }

925    public int read() throws IOException {
         if (offset >= osMemory.getSize()) return -1;

return osMemory.getByte(offset++) & 0xFF;
       }
     }
```

Fig. 9

TRANSPARENT LOADING OF RESOURCES FROM READ-ONLY MEMORY FOR AN APPLICATION PROGRAM

BACKGROUND OF THE INVENTION

1. Field of the Invention

The present invention relates to a computer system, and deals more particularly with a method, system, and computer program product for transparently loading resources (such as stored bitmaps, images, fonts, and sound files) from read-only memory ("ROM") for an application program executing on a Java Virtual Machine.

2. Description of the Related Art

Java is a robust, portable object-oriented progrannning language developed by Sun Microsystems, Inc., and which is gaining wide acceptance for writing code for the Internet and World Wide Web (hereinafter, "Web"). While compilers for most programming languages generate code for a particular operating environment, Java enables writing programs using a "write once, run anywhere" paradigm. ("Java" and "Write Once, Run Anywhere" are trademarks of Sun Microsystems, Inc.)

Java attains its portability through use of a specially-designed virtual machine ("VM"). This virtual machine is also referred to as a "lava Virtual Machine", or "JVM". The virtual machine enables isolating the details of the underlying hardware from the compiler used to compile the Java programming instructions. Those details are supplied by the implementation of the virtual machine, and include such things as whether little Endian or big Endian format is used on the machine running the Java program. Because these machine-dependent details are not reflected in the compiled code, the code can be transported to a different environment (a different hardware machine, a different operating system, etc.), and executed in that environment without requiring the code to be changed or recompiled—hence the phrase "write once, run anywhere". The compiled code, referred to as Java "bytecode", then runs on top of a JVM, where the JVM is tailored to that specific operating environment. As an example of this tailoring of the JVM, since bytecodes are generated in a canonical format (big Endian), if the JVM is running on a machine which is little Endian, then the JVM would be responsible for converting the instructions from the bytecode before passing them to the microprocessor.

The Java runtime environment includes the JVM, as well as a number of files and classes that are required to run Java application or applets. Hereinafter, the terms "JVM" and "runtime environment" will be used interchangeably unless otherwise noted.

Java applications are typically executed from a development toolkit such as the "JDK" (Java Development Kit) product from Sun Microsystems, or using the "JRE" (Java Runtime Environment) product, also from Sun Microsystems. The JRE is a subset of the JDK, providing the functionality which is required for application execution. Programs are executed from the command line when using the JRE.

A Java class called a "class loader" is used in Java environments to dynamically load classes and resources in a running program. FIG. 1 illustrates the prior art technique of class loading using a JVM and class loader. The class loader function of the JVM allows a Java application program to be loaded incrementally, as the program executes. As is known in the art, the programmer writes a Java program, and then compiles it into Java bytecodes. Files containing the Java bytecodes are called "class files". The programmer 100 then loads 101 the class files into a repository 110 or 111 of class files. At some later point, the application program 150 is executed by a JVM 140 on a client computer 160. When the application 150 attempts to use a class that has not been loaded on the client computer 160, the class loader component 130 of the JVM 140 may make a request 102a to a class server 120. (The class server function 120 is typically included in standard Web servers.) This request 102a notifies the class server 120 to fetch 103a, 104a the class file from the class repository 110, and return it 105a to the JVM 140. Alternatively, the class loader 130 may locate the desired class in a directory of a local file system 111. In this case, the desired class is requested 102b from the file system 111 and returned 105b to the JVM 140. Regardless of the location 110 or 111 from which the file was retrieved, the application 150 then continues executing, using the retrieved class file. This dynamic loading of class files operates transparently to the user of the application 150.

The Java class loader uses a predetermined search strategy when locating files, which gives precedence to particular locations. According to the Java 1.2 platform specification, the highest-priority search locations are the bootstrapped runtime and internationalization classes, named "rt.jar" and "i18n.jar", respectively. If the desired class is not found in those locations, the next-highest priority is to look in the installed extensions, which are classes in JAR files stored in the "lib/ext" directory of the JRE. ("JAR" refers to "Java archive", which is a file format used for distributing and archiving files used by an application.) Finally, if the class has still not been found, the class path system property setting is consulted. Any paths specified by the class path, and any paths identified in Class-Path attributes of the manifests of JAR files located using those paths, may be used to search for the desired class. (See "Understanding Extension Class Loading", available on the Web at http://java.sun.com/docs/books/tutoriaVext/basics/load.html, for more information.) In addition, a class file may be loaded from a known location by specifying its location in the file system (with a directory and file name identification), or from a location on a Web server by specifying its Uniform Resource Locator (URL).

This prior art approach of dynamic loading is also used for retrieval and loading of resource files used by Java applications. The resources may have been separately stored in the same directory as the executable class files; they may be packaged into the same JAR file as the class files; or they may be stored in a common directory structure with the class files, but gathered into a separate subdirectory (such as an "images" or "resources" subdirectory).

Existing class loader functionality assumes the existence of a file system, and that the CLASSPATH environment variable or "java.class.path" system property will identify a location in that file system where the class loader can dynamically search for desired class files and resources. However, a proliferation of new computing devices are being developed which are intended for mobile or portable use. These devices are designed to be lightweight, compact, and highly efficient (from a cost perspective as well as an operating perspective), and thus many are designed without the overhead of disk drives and the file system software used to access disk files. (In addition, these devices are often configured with a relatively small amount of memory, on the order of several megabytes.) Examples of these devices, referred to hereinafter as "embedded devices", include personal digital assistants (PDAs); cellular phones and screen phones; pagers; and wearable computing devices.

Resource files may be stored in the read-only memory of these embedded devices, given the absence of disk drive storage. However, the existing Java class loader mechanism preferentially searches for stored files in a file system, as previous described. Having no file system, an alternative technique must be provided for these embedded devices. This technique must efficiently locate resources needed by an application program executing on the embedded device. One technique has been described in pending U.S. patent application Ser. No. 09/373,400 titled "Access to Resource Files Stored in ROM", which is assigned to the same assignee and is incorporated herein by reference. However, that technique requires modification of existing application code to specifically search for resources in ROM storage. While this approach is beneficial in particular situations, it may alternatively be preferable to avoid application code modification. Application code modification may be undesirable because of the potential for introducing errors, the additional testing that would be required to validate the changed code, and because hundreds or thousands of applications may have been widely distributed to thousands or even millions of users—making application modification an unwieldy task.

Accordingly, what is needed is a technique with which existing application code can transparently (without modification) access resources that have been stored in ROM. This technique should be backward compatible, such that programs executing in existing computing environments which do have file systems are unaffected.

SUMMARY OF THE INVENTION

An object of the present invention is to provide a technique whereby existing application code can transparently load resources stored in ROM.

Another object of the present invention is to provide this technique through an alternative class loading mechanism.

It is another object of the present invention to provide this technique in a manner that is backward compatible with existing computing environments where resources are not stored in ROM.

Yet another object of the present invention is to provide this technique in a manner that does not require user action or user awareness of the alternative loading mechanism or strategy.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for use in a computing environment, for transparently loading resources from ROM storage. This technique comprises: storing a plurality of resource files in ROM; executing a Java Virtual Machine ("JVM") on the computer; executing an application program on the JVM; executing a ROM class loader on the JVM, the ROM class loader being adapted to loading the resource files from ROM; creating a table comprising an entry for each of the resource files; receiving, by the ROM class loader, a request from the application program for an input stream on a selected one of the resource files; using the table to locate the selected resource file in ROM; and returning the input stream using the located resource.

Each of the entries in the table preferably comprises: a key value corresponding to an identifier of a particular one of the resource files; a location of the particular resource file in ROM; and a length of data stored at the location for the particular resource file. Using the table preferably further comprises: accessing the table using an identifier of the particular resource file as a key; and returning the location and the length of the particular resource file when a matching entry is found when accessing the table.

This technique preferably further comprises configuring the JVM to use the ROM class loader. Further, the request is preferably unchanged from a pre-existing request syntax specified in preferably application program.

The present invention will now be described with reference to the following drawings, in which like reference numbers denote the same element throughout.

BRIEF DESCRIPTION OF THE DRAWINGS

FIGS. 7 through 9 depict sample Java programming language code that may be used to implement the preferred embodiment of the present invention.

DESCRIPTION OF THE PREFERRED EMBODIMENT

Figure 2:
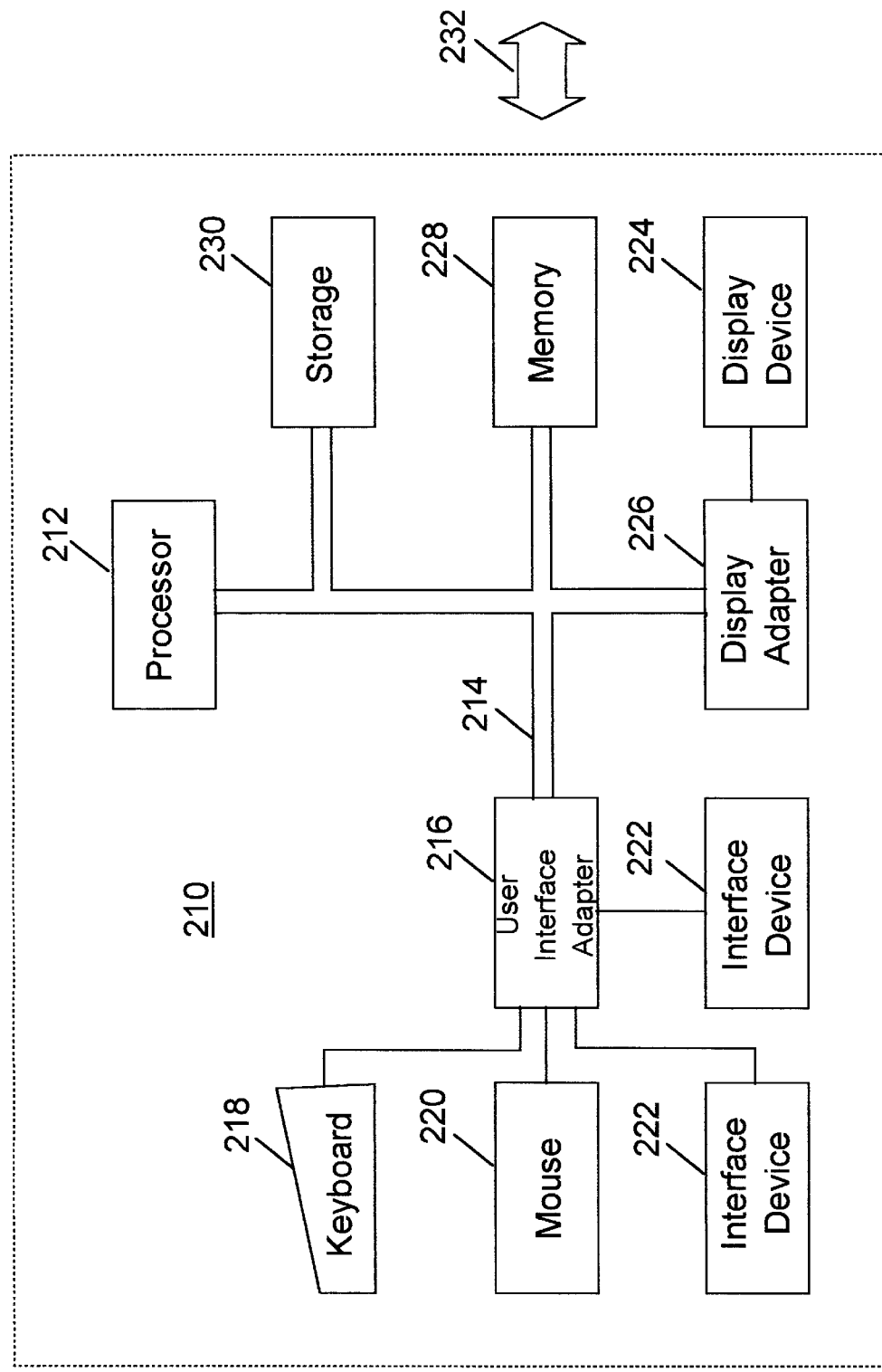
FIG. 2 is a block diagram of a computer workstation environment in which the present invention may be practiced.

FIG. 2 illustrates a representative workstation hardware environment in which the present invention may be practiced. The environment of FIG. 2 comprises a representative single user computer workstation 210, such as a personal computer, including related peripheral devices. The workstation 210 includes a microprocessor 212 and a bus 214 employed to connect and enable communication between the microprocessor 212 and the components of the workstation 210 in accordance with known techniques. The workstation 210 typically includes a user interface adapter 216, which connects the microprocessor 212 via the bus 214 to one or more interface devices, such as a keyboard 218, mouse 220, and/or other interface devices 222, which can be any user interface device, such as a touch sensitive screen, digitized entry pad, etc. The bus 214 also connects a display device 224, such as an LCD screen or monitor, to the microprocessor 212 via a display adapter 226. The bus 214 also connects the microprocessor 212 to memory 228 and long-term storage 230 which can include a hard drive, diskette drive, tape drive, etc.

The workstation 210 may communicate with other computers or networks of computers, for example via a communications channel or modem 232. Alternatively, the workstation 210 may communicate using a wireless interface at 232, such as a CDPD (cellular digital packet data) card. The workstation 210 may be associated with such other computers in a local area network (LAN) or a wide area network (WAN), or the workstation 210 can be a client in a client/server arrangement with another computer, etc. All of these configurations, as well as the appropriate communications hardware and software, are known in the art.

Figure 3:
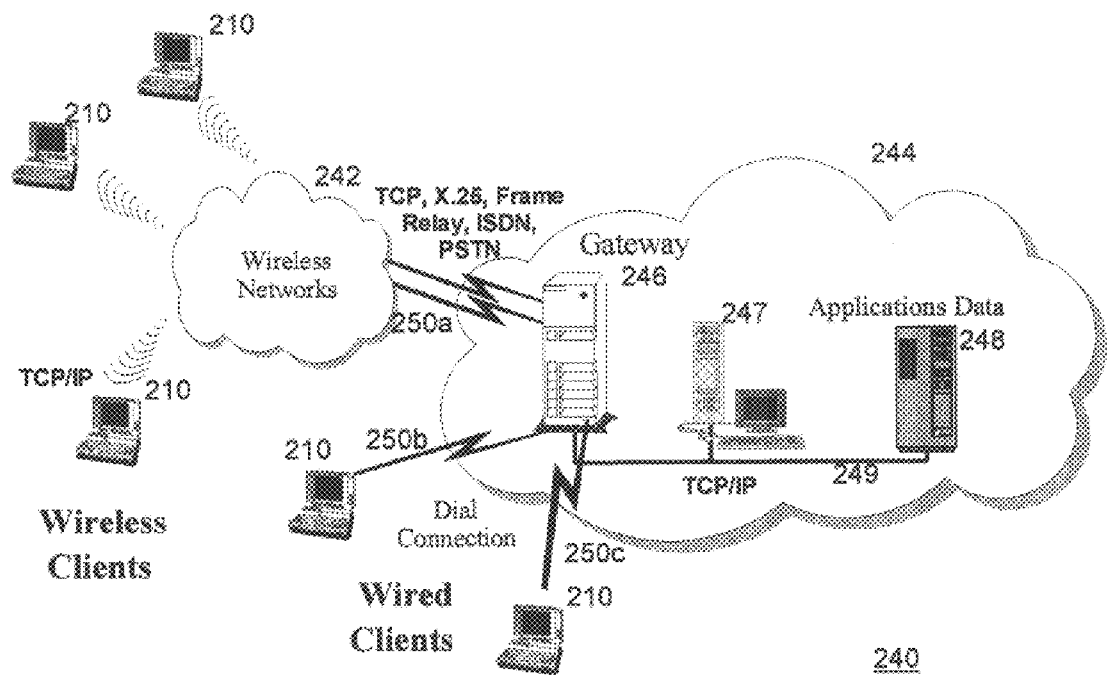
FIG. 3 is a diagram of a networked computing environment in which the present invention may be practiced.

FIG. 3 illustrates a data processing network 240 in which the present invention may be practiced. The data processing network 240 may include a plurality of individual networks, such as wireless network 242 and network 244, each of which may include a plurality of individual workstations 210. Additionally, as those skilled in the art will appreciate, one or more LANs may be included (not shown), where a LAN may comprise a plurality of intelligent workstations coupled to a host processor.

Still referring to FIG. 3, the networks 242 and 244 may also include mainframe computers or servers, such as a gateway computer 246 or application server 247 (which may access a data repository 248). A gateway computer 246 serves as a point of entry into each network 244. The gateway 246 may be preferably coupled to another network 242 by means of a communications link 250a. The gateway 246 may also be directly coupled to one or more workstations 210 using a communications link 250b, 250c. The gateway computer 246 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 246 may also be coupled 249 to a storage device (such as data repository 248). Further, the gateway 246 may be directly or indirectly coupled to one or more workstations 210.

Those skilled in the art will appreciate that the gateway computer 246 may be located a great geographic distance from the network 242, and similarly, the workstations 210 may be located a substantial distance from the networks 242 and 244. For example, the network 242 may be located in California, while the gateway 246 may be located in Texas, and one or more of the workstations 210 may be located in New York. The workstations 210 may connect to the wireless network 242 using a networking protocol such as the Transmission Control Protocol/Internet Protocol ("TCP/IP") over a number of alternative connection media, such as cellular phone, radio frequency networks, satellite networks, etc. The wireless network 242 preferably connects to the gateway 246 using a network connection 250a such as TCP or UDP (User Datagram Protocol) over IP, X.25, Frame Relay, ISDN (Integrated Services Digital Network), PSTN (Public Switched Telephone Network), etc. The workstations 210 may alternatively connect directly to the gateway 246 using dial connections 250b or 250c. Further, the wireless network 242 and network 244 may connect to one or more other networks (not shown), in an analogous manner to that depicted in FIG. 3.

Software programming code which embodies the present invention is typically accessed by the microprocessor 212 of the workstation 210 from long-term storage media 230 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 228, and accessed by the microprocessor 212 using the bus 214. The techniques and methods for embodying software programming code in memory, on physical media, and/or distributing software code via networks are well known and will not be further discussed herein.

The present invention may be used on a user workstation that is operating in standalone mode, not connected to a network. Or, the present invention may be used on a user workstation that is connected to a network. When the present invention is used in a client-server networking environment, a client computer on which the present invention operates may be connected to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The client computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the client computer will be referred to equivalently as a "workstation", "machine", "device", or "computer", and use of any of these terms or the term "server" refers to any of the types of computing devices described above.

In the preferred embodiment, the present invention is implemented as one or more modules (also referred to as code subroutines, or "objects" in object-oriented programming) of a computer software program (or programs). Typically, this implementation will reside on and execute on an embedded device. Alternatively, it may operate on a client workstation such as a desktop computer that does have disk storage and a file system, without adversely affecting operation of programs in this environment. The invention may be used with a workstation in an Internet environment. Alternatively, the environment may be a corporate intranet, an extranet, or any other network environment. Or, the present invention may be used in a stand-alone environment. When used in a networking environment, the code of the present invention operates on the client device. The program code of the preferred embodiment is preferably implemented as objects in the Java object-oriented programming language. Alternatively, the present invention may be used with program code written in any programming language, such as JavaScript or NetRexx, which executes on a Java Virtual Machine. ("JavaScript" is a trademark of Sun Microsystems, Inc., and "NetRexx" is a trademark of IBM.) The present invention may also be used in other environments having a dynamic component loading mechanism with semantics analogous to those described herein for the Java class loader.

The preferred embodiment provides transparent loading of resources from ROM using a set of components defined herein, discussed in more detail below with reference to FIGS. 4–9, which work together as will be described. These components are: (1) an object class referred to herein as "OSMemory", which allows application code to access ROM memory; (2) an object class referred to as "OSMemoryInputStream", which is a subclass of the java.io.InputStream class and which provides the stream interface for an OSMemory object; and (3) an object class referred to as "RomLoadingClassLoader", which is a novel Java class loader that knows how to load resources out of ROM.

Figure 1:
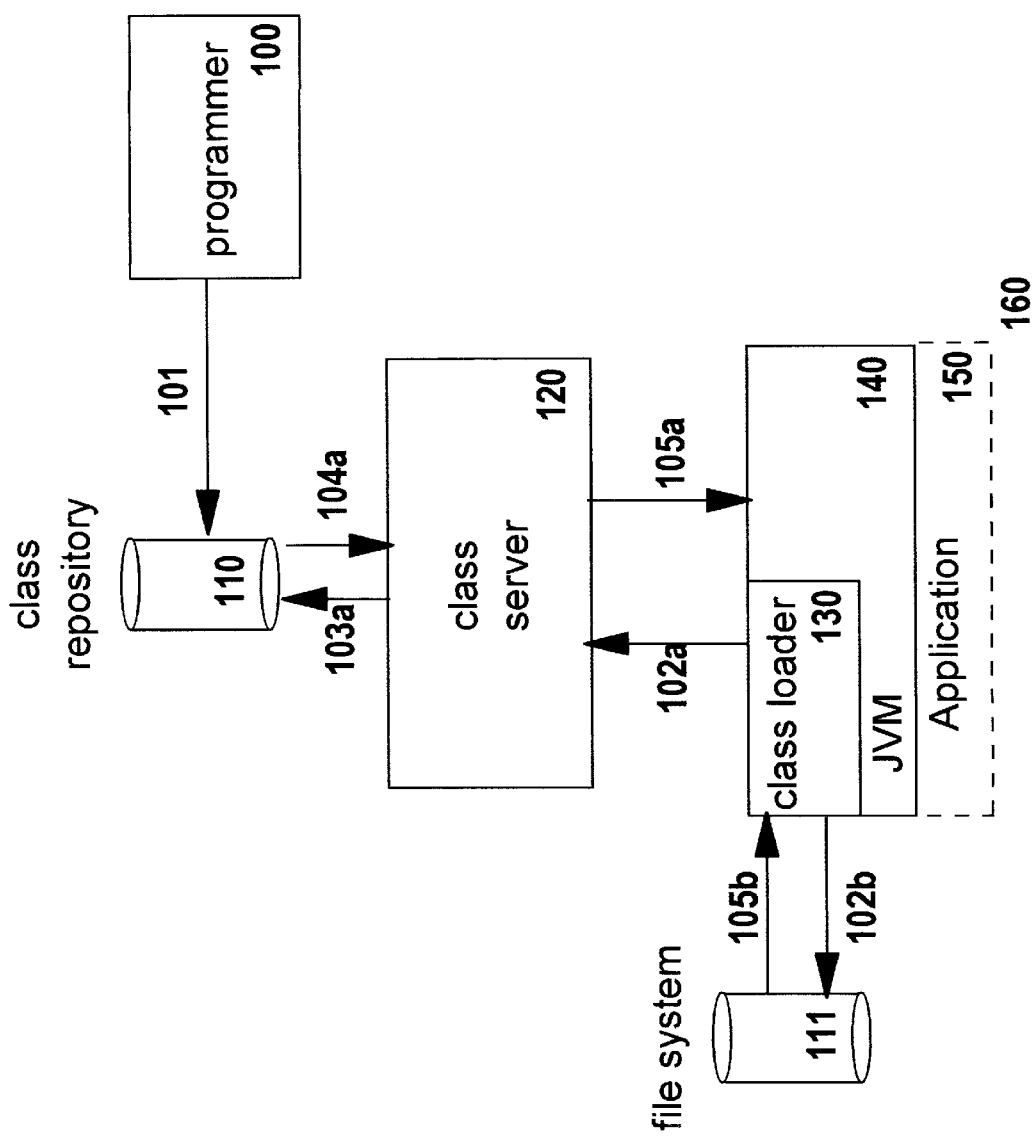
FIG. 1 illustrates the prior art technique of class loading using a Java Virtual Machine.

As previously stated with reference to FIG. 1, class loaders are used in Java applications to load classes and resources dynamically, as the class or resource is needed by the executing application; when a program requests a resource or invokes a class, it is the ClassLoader that finds and returns the resource or class.

In application code according to the prior art, accessing resources typically involves calling the Class.getResourceAsStream( ) method against a class. This method takes the name of the resource as an argument. The Class.getResourceAsStream( ) method ends up calling the ClassLoader.getResourceAsStream( ) method. Every class has a ClassLoader object associated with it. The various getResourceAsStream( ) methods return an object of type InputStream. This InputStream object is the standard interface the application code uses to read the resource data.

The method invocations used in this prior art approach for loading a resource from application code (as described previously with reference to the system architecture of FIG. 1) are generally as follows, where an example resource named "picture.gif" is being requested:

(1) The application calls getClass.getResourceAsStream ("picture.gif").

(2) Class.getResourceAsStream( ) determines the package name of the class in which it is defined, prepends that to the requested resource name, and (assuming the package name is "package_name") calls getClassLoader.getResourceAsStream("package_name/picture.gif").

(3) ClassLoader.getResourceAsStream("package_name/picture.gif") finds the "picture.gif" resource as a file in a file system, or a file in a JAR file, or on a web server, and returns an InputStream object which the application can use to read the data in the resource file.

As stated above, the present invention defines a novel class loader referred to herein as the object "RomLoadingClassLoader". This RomLoadingClassLoader is the class loader for all classes loaded from ROM. This implementation of this class loader determines where a requested resource is located in memory, using a table of resource names. According to the preferred embodiment, resources will be packaged together along with classes, and loaded into ROM as an image. The technique with which the packaging is performed does not form part of the present invention. The co-locating of classes and resources in this manner increases the ease with which a particular class and its required resources can be installed and uninstalled. Once the resources have been packaged together, a utility program (which does not form part of the present invention) is run against the packaged image. This utility program determines the names or identifiers of the resources contained in the image (which will be a string value), the location of the beginning of the stored resource within the image, and the length of the resource's stored data. From this information, the utility program constructs a table to be used for accessing the stored resources, where each entry in the table (or other storage mechanism, such as an array) comprises a key value set to the string identifier, and a value that preferably comprises (1) a pointer to the location of the resource and (2) the resource length. A commercially-available product that may be used to pack resources, and create a table identifying the resources in the manner described, is the jxeLink tool shipped with the IBM VisualAge® for Embedded Systems, Java™ Technology Edition product from the IBM Corporation. As will be obvious to one of skill in the art, this access table technique may also be used when resources have not been packaged together. What is required in this situation is that the identifiers, locations, and length values for the stored resources are known. A table can then be constructed using this information.

When asked for a resource by an invocation of getResourceAsStream( ), romLoadingClassLoader checks this table of resources currently available in ROM. If it finds an entry for the requested resource, it creates an object of type OSMemoryInputStream. This object is a subclass of InputStream, so can safely be returned to the application code. The implementation of this class allows InputStream behavior over ROM memory. Thus, an existing program expecting to read a resource from an input stream functions transparently, whether executing on a desktop machine where the resource was located in a file system, or whether executing on an embedded device where the resource was located in ROM.

The preferred embodiment of the present invention uses the following method invocations, assuming the same requested resource "picture.gif" used in the prior example, to load a resource from application code:

(1) The application calls getClass.getResourceAsStream ("picture.gif"). This invocation is unchanged from the prior art, and thus existing applications will continue to work without requiring modification of their existing invocation syntax.

(2) Class.getResourceAsStream( ) determines the package name of the class in which it is defined, prepends that to the requested resource name, and calls RomLoadingClassLoader.getResourceAsStream ("package_name/picture.gif"). At this point, the novel class loader of the present invention is invoked instead of the prior art class loader.

(3) RomLoadingClassLoader.getResourceAsStream( ) finds the object's location in ROM, using the resource table. It constructs an OSMemory object which preferably specifies (1) a pointer to the object location, and (2) the length of the resource data stored at that location. The method then creates an OSMemoryInputStream object for this OSMemory object. Since this object conforms to the InputStream protocol the application is expecting, the application reads the data just as if it had come from a file stored in a file system.

Figure 4:
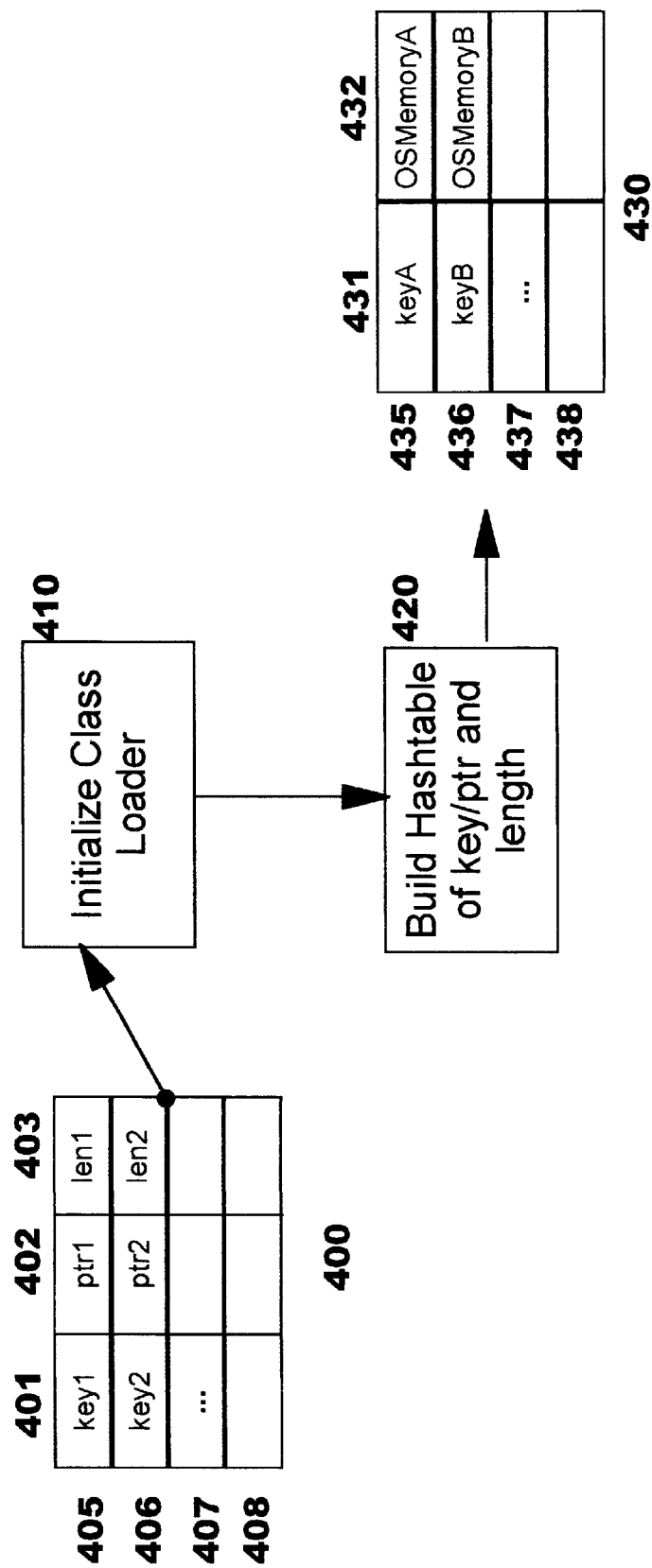
FIGS. 4 through 6 depict flow charts which set forth the logic involved in implementing the preferred embodiment of the present invention.
Figure 5:
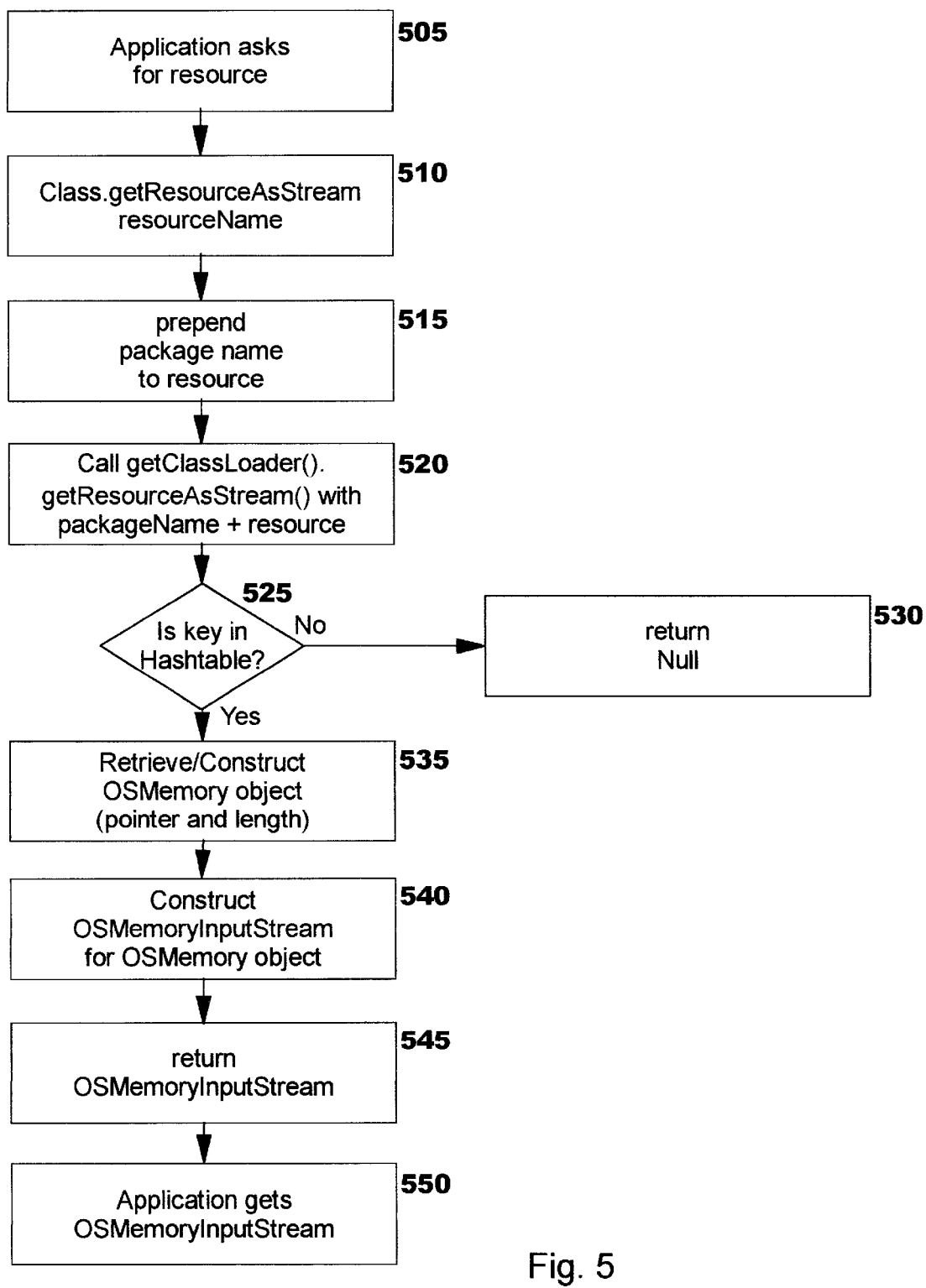
Figure 6:
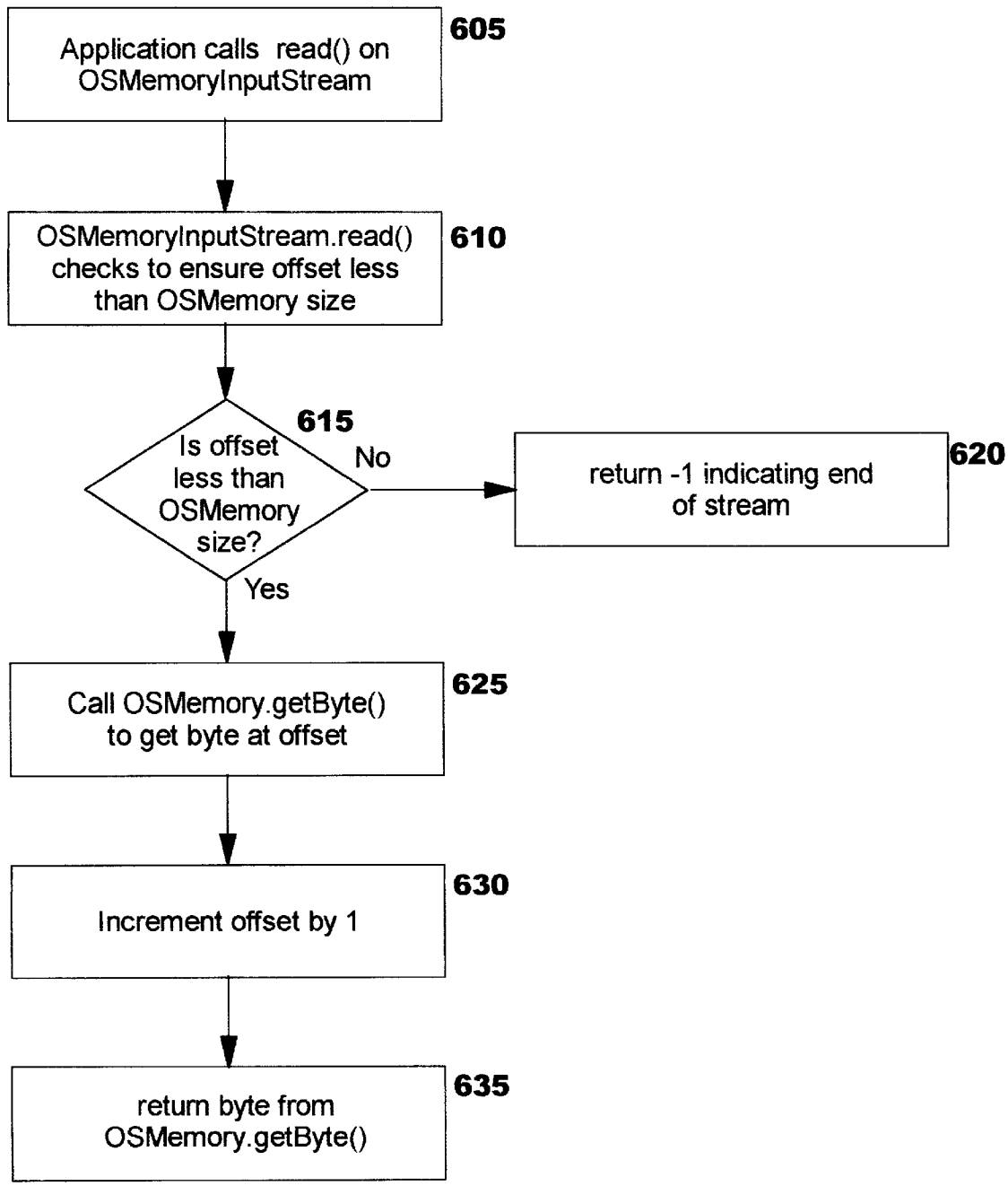

The preferred embodiment of the present invention will now be discussed in more detail with reference to FIGS. 4 through 9. FIGS. 4–6 are flow charts set forth the logic involved with the preferred embodiment, and FIGS. 7–9 depict sample Java programming language classes and methods which may be used to implement the preferred embodiment.

According to the present invention, the computing system needs to be set up to load classes and resources from ROM, but this is done without changes to the application code. What is required is to identify the new class loader, romLoadingClassLoader, to the JVM for use when it starts up. Thus, existing application code does not need to change to cause the present invention to operate. Techniques for specifying a class loader as an option of the JVM are known in the art, and are system-specific; thus, these techniques will not be described in detail herein. Many embedded devices use Java code to support their user interface. Such a device will therefore start up a JVM on powering up the device. Otherwise, the JVM will start up when an application that runs on the JVM is executed. The manner in which the JVM is started does not form part of the present invention.

FIG. 4 depicts an initialization process that occurs when the romLoadingClassLoader executes. The programming language statements that correspond to this process are shown in FIG. 7, as the methods 710, 715 of the class 705 in package 700. A message is sent to the method RomLoadingClassLoader 710, passing a pointer 711 to the resource table 400. Invocation of method 710 corresponds to Block 410 of FIG. 4. This method 710 invokes the method initializeResTable 715, as shown at 712, also passing the resource table pointer. Invocation of method 715 corresponds to Block 420. As previously described, the resource table 400 contains some number of entries 405, 406, 407, 408, etc., each of which has a key 401, a pointer 402, and a length value 403. Method 715 creates a hash table 430 from resource table 400. According to the preferred embodiment, the entries 435, 436, 437, 438, etc. each comprises (1) the same key value 431 from the corresponding resource table entry and (2) an OSMemory object 432. Each OSMemory object 432 comprises the pointer and length value from the corresponding resource table entry (as defined at elements 806, 807 of OSMemory class 805 in FIG. 8). The hashTable object created by method 715 is referred to in FIG. 7 as "resTable", as indicated at element 706.

Techniques for creating a hash table are known in the art, and may use the standard Java class "Hashtable". Thus, the details of method 715 are not shown in FIG. 7. Further, using a hash table is an optional optimization that is used in the preferred embodiment to increase the speed of retrieving resource information. Creating and using a hash table requires additional storage space for storing the table, and thus a particular implementation may choose to optimize space instead of speed, and not use a hash table implementation.

Now that the roniLoadingClassLoader is installed as the class loader and has built its hash table 430, execution of the application code begins. FIG. 5 depicts the logic flow of an application program requesting a resource, and the technique with which the preferred embodiment locates the resource in ROM and returns an input stream to the application. Suppose the application program contains code to create an input stream on a picture stored as a ".gif" file and having the resource name "picture.gif", as in the prior example, and that the programmer has chosen the name "pictureStream" as the stream which will be used for this resource. The method invocation may then be as follows:

pictureStream=getClass( ).getResourceAsStream("picture.gif")

This programming statement corresponds to Block 505 of FIG. 5. This statement causes the Class( ).getResourceAsStream( ) method to be invoked on the object class, passing the resource name "picture.gif", as shown at Block 510. The class will automatically determine its package name, according to the prior art, and will then automatically prepend that name to the resource name parameter (Block 515). If the package name is "package_name/ . . . ", for example, Block 515 creates the string "package_name/ . . . /picture.gif". The class will then invoke a method on its class loader, passing this string as a parameter (Block 520). This invocation occurs automatically, according to the prior art, and will be of the form:

getClassLoader( ).getResourceAsStream("package_name/ . . . /picture.gif")

Because the romLoadingClassLoader has been installed as the class loader, and is defined as a subclass of ClassLoader (see element 707 of FIG. 7), it will intercept this request. The method getResourceAsStream 720 in the romLoadingClassLoader class 705 will then execute. Blocks 525 through 545 correspond to method 720. A determination is made (Block 525) as to whether an entry exists in the hash table 430 for this resource. According to the example, the key used to access the hash table would be "package_name/ . . . /picture.gif". If the key was not located in the table, Block 530 returns a null value to the application, and the processing of FIG. 5 ends for the current resource request. Application-specific processing may then handle this condition, for example by generating an exception condition or error message to the user; such processing is outside the scope of the present invention. Otherwise, when the key was found, Block 535 retrieves the OSMemory object 432 from the hash table. (If a hash table has not been constructed, as discussed above, then Block 525 checks resource table 400. If the key is found in this table, Block 535 creates an OSMemory object from the stored pointer 402 and length value 403 from resource table 400.)

An OSMemoryInputStream object is then constructed (Block 540) for this OSMemory object. This occurs when the method invocation at 721 is executed, causing the method getInputstream 825 of the OSMemory class 805 to be invoked. The method 825 subsequently invokes method OSMemoryInputStream 910 of the OSMemoryInputStream class 905. Method 910 returns an input stream object, of type OSMemoryInputStream, to the invoking method at 721. This input stream is then returned (Block 545) to the application program, which gets the OSMemoryInputStream object (Block 550) and then proceeds to use this object for accessing the resource. In the example programming statement used earlier, the application would assign this stream object to the object "pictureStream".

Now that the application has an input stream for use in accessing the resource, as an instance of OSMemoryObjectStream, it may begin to use that instance as depicted in FIG. 6. At Block 605, the application calls the read( ) method on OSMemoryInputStream. An example read method is depicted in FIG. 9 at 925. Blocks 610 through 635 represent the logic that corresponds to the code in this method 925. As indicated at Block 610, the reado method checks to ensure that the value of the offset instance variable is less than the overall size of the resource. This is determined by invoking the getsize( ) method 820, which returns 821 the value of the "size" instance variable 811). If this comparison (Block 615) has a negative result, then a −1 is preferably returned (Block 620) to the application, indicating that the end of the stream has been reached. The processing of FIG. 6 then ends. Otherwise, when Block 615 has a positive result, processing continues at Block 625, where the getByte( ) method 815 is invoked. This method 815 returns the byte stored at the location computed by adding the offset value to the value of the pointer which points to the beginning of the resource. (The details of implementing this native method do not form part of the present invention, and will be obvious to one of ordinary skill in the art.) The invoking method 925 subsequently returns this byte (Block 635) to the application, and the processing of FIG. 6 ends for this invocation. (Note that while FIGS. 6 and 9 depict an application obtaining a single byte at a time, methods defined according to the prior art may be used to obtain multiple bytes with a single invocation, where the underlying code of the prior art method provides for iteratively invoking the return of a single byte).

Thus, it can be seen that the present invention provides an advantageous technique for loading resources from ROM storage in a manner that is transparent to an application program. This avoids the need for modifying existing application code when storing resources in ROM, such that the application continues to execute, unaware that the resources are in storage other than "conventional" storage such as a file system or a Web server.

As will be obvious to one of ordinary skill in the art, the class and object names used herein are merely illustrative, and other names may be used equivalently. In addition, methods may be added to the classes depicted herein, additional functionality may be added to those methods which have been described, and alternative class structures to those depicted in FIGS. 7–9 may be used, all without deviating from the inventive concepts disclosed herein.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product embodied on a computer-readable medium readable by a computer in a computing environment, for transparently loading resources from a read-only memory ("ROM") of said computer, comprising:

a plurality of resource files stored in said ROM;

computer-readable program code means for executing a Java Virtual Machine ("JVM") on said computer;

computer-readable program code means for executing an application program on said JVM;

computer-readable program code means for executing a ROM class loader on said JVM, said ROM class loader being adapted to loading said resource files from said ROM;

computer-readable program code means for creating a table comprising an entry for each of said resource files;

computer-readable program code means for receiving, by said ROM class loader, a request from said application program for an input stream on a selected one of said resource files;

computer-readable program code means for using said table to locate said selected resource file in said ROM; and computer-readable program code means for returning said input stream using said located resource.

2. The computer program product for transparently loading resources according to claim 1, wherein each of said entries in said table comprises:

a key value corresponding to an identifier of a particular one of said resource files;

a location of said particular resource file in said ROM; and a length of data stored at said location for said particular resource file; and wherein said computer-readable program code means for using said table further comprises:

computer-readable program code means for accessing said table using an identifier of said particular resource file as a key; and computer-readable program code means for returning said location and said length of said particular resource file when a matching entry is found in said table by said computer-readable program code means for accessing.

3. The computer program product for transparently loading resources according to claim 1, further comprising computer-readable program code means for configuring said JVM to use said ROM class loader.

4. The computer program product for transparently loading resources according to claim 1, wherein said request is unchanged from a pre-existing request syntax specified in said application program.

5. A system in a computing environment for transparently loading resources from a read-only memory ("ROM") of a computer in said computing environment, comprising:

a plurality of resoutce files stored in said ROM;

means of executing a Java Virtual Machine("JVM")on said computer;

means for executing an application program on said JVM;

means for executing a ROM class loader on said JVM, said ROM class loader being adapted to loading said resource files from said ROM;

means for creating a table comprising an entry for each of said resource files;

means for receiving, by said ROM class loader, a request from said application program for an input stream on a selected one of said resource files;

means for using said table to locate said selected resource file in said ROM; and means for returning said input stream using said located resource.

6. The system for transparently loading resources according to claim 5, wherein each of said entries in said table comprises:

a key value corresponding to an identifier of a particular one of said resource files;

a location of said particular resource file in said ROM; and a length of data stored at said location for said particular resource file; and wherein said means for using said table further comprises:

means for accessing said table using an identifier of said particular resource file as a key; and means for returning said location and said length of said particular resource file when a matching entry is found in said table by said means for accessing.

7. The system for transparently loading resources according to claim 5, further comprising means for configuring said JVM to use said ROM class loader.

8. The system for transparently loading resources according to claim 5, wherein said request is unchanged from a pre-existing request syntax specified in said application program.

9. A method for transparently loading resources from a read-only memory ("ROM") of a computer in a computing environment, comprising the steps of:

storing a plurality of resource files in said ROM;

executing a Java Virtual Machine ("JVM") on said computer;

executing an application program on said JVM;

executing a ROM class loader on said JVM, said ROM class loader being adapted to loading said resource files from said ROM;

creating a table comprising an entry for each of said resource files;

receiving, by said ROM class loader, a request from said application program for an input stream on a selected one of said resource files;

using said table to locate said selected resource file in said ROM; and returning said input stream using said located resource.

10. The method for transparently loading resources according to claim 9, wherein each of said entries in said table comprises:

a key value corresponding to an identifier of a particular one of said resource files;

a location of said particular resource file in said ROM; and a length of data stored at said location for said particular resource file; and wherein said using said table step further comprises the steps of:

accessing said table using an identifier of said particular resource file as a key; and returning said location and said length of said particular resource file when a matching entry is found in said table by said accessing step.

11. The method for transparently loading resources according to claim 9, further comprising the step of configuring said JVM to use said ROM class loader.

12. The method for transparently loading resources according to claim 9, wherein said request is unchanged from a pre-existing request syntax specified in said application program.

* * * * *